United States Patent
Yamayoshi et al.

(10) Patent No.: US 11,819,956 B2
(45) Date of Patent: *Nov. 21, 2023

(54) ALUMINUM ALLOY BRAZING SHEET AND METHOD FOR MANUFACTURING THE SAME

(71) Applicant: UACJ Corporation, Tokyo (JP)

(72) Inventors: Tomoki Yamayoshi, Tokyo (JP); Taichi Suzuki, Tokyo (JP); Hirokazu Tanaka, Tokyo (JP)

(73) Assignee: UACJ Corporation, Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 17/600,705

(22) PCT Filed: Apr. 3, 2020

(86) PCT No.: PCT/JP2020/015339
§ 371 (c)(1),
(2) Date: Oct. 1, 2021

(87) PCT Pub. No.: WO2020/204167
PCT Pub. Date: Oct. 8, 2020

(65) Prior Publication Data
US 2022/0184750 A1     Jun. 16, 2022

(30) Foreign Application Priority Data
Apr. 4, 2019  (JP) .................. 2019-071932

(51) Int. Cl.
*B23K 35/28* (2006.01)
*B23K 35/02* (2006.01)
(Continued)

(52) U.S. Cl.
CPC ........ *B23K 35/288* (2013.01); *B23K 35/0238* (2013.01); *B32B 15/016* (2013.01);
(Continued)

(58) Field of Classification Search
None
See application file for complete search history.

(56) References Cited

U.S. PATENT DOCUMENTS 7,875,129 B2 * 1/2011 Safrany .................. C23C 22/34
148/275
2015/0118517 A1 4/2015 Itoh et al.
(Continued)

FOREIGN PATENT DOCUMENTS

| CN | 108202188 A | 6/2018 |
| CN | 108367395 A | 8/2018 |

(Continued)

OTHER PUBLICATIONS

International Search Report dated Jun. 30, 2020, issued in counterpart application No. PCT/JP2020/015339, w/English translation (6 pages).

(Continued)

*Primary Examiner* — Daniel J. Schleis
(74) *Attorney, Agent, or Firm* — WHDA, LLP

(57) ABSTRACT

An aluminum alloy brazing sheet used for brazing in an inert gas atmosphere without using a flux includes a brazing material cladded onto at least one side surface of a core material. An oxide is formed on a surface of the aluminum alloy brazing sheet by brazing heating, the oxide including any one or two or more of Mg, Li, and Ca and having a volume change ratio of 0.990 or less to a surface oxide film formed before brazing heating, and an atomic molar ratio of Mg, Li, and Ca to Al in the oxide formed on the surface of the aluminum alloy brazing sheet before brazing heating is 0.50 or less. The present invention provides an aluminum alloy brazing sheet having excellent brazability in brazing in an inert gas atmosphere without using a flux, and a method for manufacturing the same.

12 Claims, 1 Drawing Sheet

(51) Int. Cl.
  *B32B 15/01* (2006.01)
  *C22C 21/02* (2006.01)
  *C22C 21/10* (2006.01)
  *C22F 1/043* (2006.01)
  *C22F 1/053* (2006.01)
(52) U.S. Cl.
  CPC .............. *C22C 21/02* (2013.01); *C22C 21/10* (2013.01); *C22F 1/043* (2013.01); *C22F 1/053* (2013.01)

(56) References Cited

U.S. PATENT DOCUMENTS

| | | | |
|---|---|---|---|
| 2018/0297138 A1 | 10/2018 | Yamayoshi et al. | |
| 2018/0304415 A1* | 10/2018 | Yamayoshi | ............ B23K 35/38 |

FOREIGN PATENT DOCUMENTS

| | | |
|---|---|---|
| CN | 108431260 A | 8/2018 |
| JP | 10-180489 A | 7/1998 |
| JP | 11-285817 A | 10/1999 |
| JP | 2004-358519 A | 12/2004 |
| JP | 4547032 B1 | 9/2010 |
| JP | 2013-215797 A | 10/2013 |
| JP | 2013-220461 A | 10/2013 |
| JP | 2015-058466 A | 3/2015 |
| JP | 2017-074609 A | 4/2017 |
| WO | 2013/168669 A1 | 11/2013 |
| WO | 2017/065190 A1 | 4/2017 |
| WO | 2018/100793 A1 | 6/2018 |

OTHER PUBLICATIONS

Written Opinion dated Jun. 30, 2020, issued in counterpart application No. PCT/JP2020/015339 (3 pages).
Office Action dated Aug. 3, 2022, issued in counterpart CN application No. 202080026401.8, with English translation. (19 pages).
Office Action dated Mar. 30, 2023, issued in counterpart CN Application No. 202080026401.8, with English translation. (22 pages).

* cited by examiner

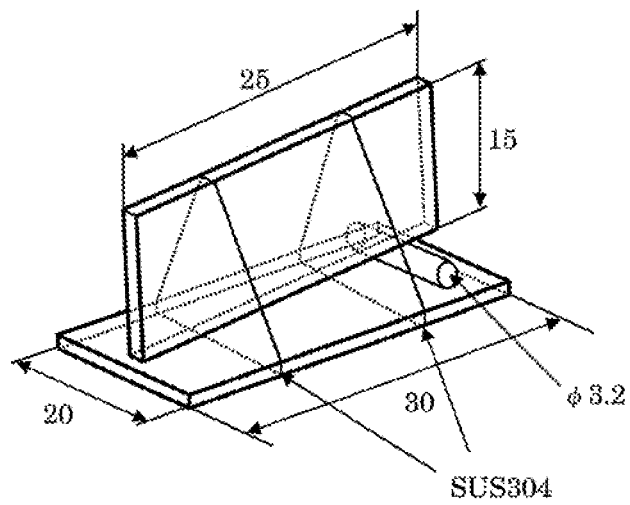
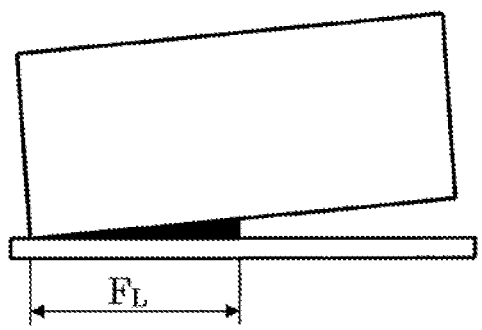

ALUMINUM ALLOY BRAZING SHEET AND METHOD FOR MANUFACTURING THE SAME

TECHNICAL FIELD

The present invention relates to an aluminum alloy brazing sheet used for brazing of aluminum or an aluminum alloy in an inert gas atmosphere without using a flux, and a method for manufacturing the same.

BACKGROUND ART

Brazing joint is widely used as a method for joining aluminum products including a number of minute joining portions, such as heat exchangers and machine components formed of aluminum. To execute brazing joint for aluminum or an aluminum alloy, it is indispensable to break an oxide film covering the surface thereof and expose and wet the molten brazing material with a base material or a similarly molten brazing material. Methods for breaking the oxide film are broadly divided into methods of using a flux in a nitrogen gas furnace and methods using no flux in a vacuum heating furnace, and both of them have been put to practical use.

In the methods using a flux in a nitrogen gas furnace, the flux reacts with the oxide film during brazing heating, and breaks the oxide film. However, the methods have a problem of increase in cost of the flux and cost of the step of applying a flux. In addition, when the flux is nonuniformly applied, defective brazing may occur. By contrast, in the methods using no flux in a vacuum heating furnace, a brazing material formed of an Al—Si—Mg based alloy is used, Mg in the brazing material is evaporated by heating in vacuum, and the oxide film on the surface of the material is broken. However, the methods have the problem that expensive vacuum heating facilities are required. The methods also have the problem that high maintenance cost is required to remove adhering Mg, because evaporated Mg adheres to the inside of the furnace. For this reason, there are increasing needs for executing joint without using a flux in a nitrogen gas furnace.

To satisfy the needs as described above, for example, Patent Literature 1 proposes including Mg in the brazing material to enable surface joint. In addition, Patent Literature 2 proposes including Mg in the core material and diffusing Mg into the brazing material during brazing heating to enable fillet formation in a simple fin/tube joint. In addition, Patent Literature 2 discloses that good flux-free brazability can be obtained by limiting the equivalent circle diameter and the number of Si particles included in the brazing material and bringing the brazing material and the brazing target material into close contact with each other. However, it is impossible for these methods to form sufficient fillet without application of a flux in a joint having a clearance. Specifically, in these methods, the oxide film is broken into particles with Mg, and thereafter a new surface of the molten brazing material is exposed by a difference in thermal expansion between the molten brazing material and the oxide film or external force, such as a flow of brazing filler metal, to cause wetting. For this reason, these methods cause formation of distorted fillet accompanied with discontinuance of the fillet.

In addition, Patent Literature 3 proposes that it is effective to suppress the thickness of a MgO film existing on the oxide film before brazing heating. However, in Patent Literature 3 with the brazing material containing Mg of 0.1 mass % or more, because an MgO based film is partly formed during brazing heating in a practical joint and inhibits formation of fillet, discontinuance of fillet is caused. By contrast, Patent Literature 4 proposes a method of removing an MgO based film and enabling fluxless brazing, by executing acid cleaning for a brazing material containing Mg of 0.05 mass % or more before brazing heating. However, the method is not capable of sufficiently suppressing formation of a MgO based film during brazing heating, like Patent Literature 1.

Patent Literature 5 proposes a brazing sheet in which oxide particles comprising an X element (X is Mg, Li, Be, Ca, Ce, La, Y, and Zr) having a volume change ratio of 0.99 or less to the oxide film before brazing heating are formed on the surface. Although this structure has enhanced brazability for a more practical joint having a clearance, an actual heat exchanger has a larger clearance, and the brazability of the structure may be insufficient.

PRIOR ART LITERATURES

Patent Literatures

Patent Literature 1: Japanese Patent Application Laid-open No. 2013-215797-A
Patent Literature 2: Japanese Patent No. 4547032
Patent Literature 3: Japanese Patent Application Laid-open No. 2004-358519-A
Patent Literature 4: Japanese Patent Application Laid-open No. H11-285817-A
Patent Literature 5: Japanese Patent Application Laid-open No. 2017-074609-A

SUMMARY OF INVENTION

Problem to be Solved by Invention

An object of the present invention is to provide an aluminum alloy brazing sheet having excellent brazability even in the case of having a large clearance, as well as a close contact part between members of a heat exchanger, in brazing in an inert gas atmosphere without using a flux, and a method for manufacturing the same.

Means for Solving Problem

The problem described above is solved by the present invention described hereinafter.

Specifically, the present invention (1) provides an aluminum alloy brazing sheet used for brazing in an inert gas atmosphere without using a flux, the aluminum alloy brazing sheet comprising:
 a brazing material cladded onto at least one side surface of a core material,
 the core material being formed of aluminum or an aluminum alloy core material comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities,
 the brazing material being an aluminum alloy brazing material comprising Si of 4.00 to 13.00 mass %, and any one or two or more of Mg more than 0.03 mass % and 3.00 mass % or less, Li more than 0.03 mass % and 3.00 mass % or less, and Ca more than 0.03 mass % and 3.00 mass % or less, with the balance being aluminum and inevitable impurities, in which an oxide is formed on a surface of the aluminum alloy brazing sheet by brazing heating, the oxide including any one or two or more of Mg, Li, and Ca and having a volume change ratio of 0.990 or less to a surface oxide film formed before brazing heating, and an atomic molar ratio of Mg, Li, and Ca to Al in the oxide formed on the surface of the aluminum alloy brazing sheet before brazing heating is 0.5 or less.

The present invention (2) provides the aluminum alloy brazing sheet according to (1), in which the aluminum alloy brazing sheet is a two-layer material in which the brazing material is cladded onto one side surface of the core material.

The present invention (3) provides the aluminum alloy brazing sheet according to (1), in which the aluminum alloy brazing sheet is a three-layer material in which the brazing material is cladded onto each of both side surfaces of the core material.

The present invention (4) provides the aluminum alloy brazing sheet according to (1), in which the aluminum alloy brazing sheet is a three-layer material in which the brazing material is cladded onto one side surface of the core material and a cladding material is cladded onto the other side surface of the core material, and the cladding material is an aluminum alloy cladding material formed of aluminum or an aluminum alloy comprising Zn of 6.00 mass % or less, with the balance being aluminum and inevitable impurities.

The present invention (5) provides the aluminum alloy brazing sheet according to any one of (1) to (4), in which the core material further comprises any one or two or more of Mg of 3.00 mass % or less, Li of 3.00 mass % or less, and Ca of 3.00 mass % or less.

The present invention (6) provides the aluminum alloy brazing sheet according to any one of (1) to (6), in which the core material further comprises Bi of 1.00 mass % or less.

The present invention (7) provides the aluminum alloy brazing sheet according to any one of (1) to (6), in which the brazing material further comprises Bi of 1.00 mass % or less.

The present invention (8) provides the aluminum alloy brazing sheet according to any one of (1) to (7), in which the brazing material further comprises any one or two or more of Na of 0.05 mass % or less, Sr of 0.05 mass % or less, Sb of 0.05 mass % or less, Zn of 8.00 mass % or less, Cu of 4.00 mass % or less, Fe of 1.00 mass % or less, Mn of 1.00 mass % or less, Cr of 0.30 mass % or less, Ti of 0.30 mass % or less, Zr of 0.30 mass % or less, In of 0.10 mass % or less, and Sn of 0.10 mass % or less.

The present invention (9) provides the aluminum alloy brazing sheet according to any one of (4) to (8), in which the cladding material further comprises any one or two or more of Mn of 2.00 mass % or less, Mg of 3.00 mass % or less, Si of 5.00 mass % or less, Fe of 1.50 mass % or less, Cu of 1.00 mass % or less, Ti of 0.30 mass % or less, Zr of 0.30 mass % or less, Cr of 0.30 mass % or less, In of 0.10 mass % or less, and Sn of 0.10 mass % or less.

The present invention (10) provides the aluminum alloy brazing sheet according to any one of (1) to (9), in which the oxide formed on a brazing material surface of the aluminum alloy brazing sheet has a thickness of 50 nm or less.

The present invention (11) provides a method for manufacturing an aluminum alloy brazing sheet, the method comprising executing at least hot working and cold working for (1) a stacked structure acquired by stacking a brazing material ingot and a core material ingot in this order; (2) a stacked structure acquired by stacking a brazing material ingot, a core material ingot, and a brazing material ingot in this order; or (3) a stacked structure acquired by stacking a brazing material ingot, a core material ingot, and a cladding material ingot in this order, to acquire an aluminum alloy brazing sheet, in which the core material ingot is formed of aluminum or an aluminum alloy comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities, the brazing material ingot is formed of an aluminum alloy comprising Si of 4.00 to 13.00 mass %, and any one or two or more of Mg more than 0.03 mass % and 3.00 mass % or less, Li more than 0.03 mass % and 3.00 mass % or less, and Ca more than 0.03 mass % and 3.00 mass % or less, with the balance being aluminum and inevitable impurities, the cladding material ingot is formed of aluminum or an aluminum alloy comprising Zn of 6.00 mass % or less, with the balance being aluminum and inevitable impurities, and intermediate annealing, final annealing, or annealing is executed, the intermediate annealing being executed between rolling passes in the cold working to heat the stacked structure at 250 to 450° C. for one hour or more in an atmosphere controlled to have an oxygen concentration of 10,000 ppm or less and a dew point of 20° C. or less, the final annealing being executed after a last pass of the cold working to heat the stacked structure at 250 to 450° C. for one hour or more in an atmosphere controlled to have an oxygen concentration of 10,000 ppm or less and a dew point of 20° C. or less, and the annealing being executed both between rolling passes in the cold working and after the last pass of the cold working to heat the stacked structure at 250 to 450° C. for one hour or more in an atmosphere controlled to have an oxygen concentration of 10,000 ppm or less and a dew point of 20° C. or less.

The present invention (12) provides the method for manufacturing an aluminum alloy brazing sheet according to (11), in which the core material ingot further comprises any one or two or more of Mg of 3.00 mass % or less, Li of 3.00 mass % or less, and Ca of 3.00 mass % or less.

The present invention (13) provides the method for manufacturing an aluminum alloy brazing sheet according to (11) or (12), in which one of the core material ingot and the brazing material ingot further comprises Bi of 1.00 mass % or less.

The present invention (14) provides the method for manufacturing an aluminum alloy brazing sheet according to any one of (11) to (13), in which the brazing material ingot further comprises any one or two or more of Na of 0.05 mass % or less, Sr of 0.05 mass % or less, Sb of 0.05 mass % or less, Zn of 8.00 mass % or less, Cu of 4.00 mass % or less, Fe of 1.00 mass % or less, Mn of 1.00 mass % or less, Cr of 0.30 mass % or less, Ti of 0.30 mass % or less, Zr of 0.30 mass % or less, In of 0.10 mass % or less, and Sn of 0.10 mass % or less.

The present invention (15) provides the method for manufacturing an aluminum alloy brazing sheet according to any one of (11) to (14), in which the cladding material ingot further comprises any one or two or more of Mn of 2.00 mass % or less, Mg of 3.00 mass % or less, Si of 5.00 mass % or less, Fe of 1.50 mass % or less, Cu of 1.00 mass % or less, Ti of 0.30 mass % or less, Zr of 0.30 mass % or less, Cr of 0.30 mass % or less, In of 0.10 mass % or less, and Sn of 0.10 mass % or less.

The present invention (16) provides the method for manufacturing an aluminum alloy brazing sheet according to any one of (11) to (15), in which a brazing material surface of a clad material is subjected to etching using one or both of an acid aqueous solution and an alkaline aqueous solution, the etching being executed after the intermediate annealing when the intermediate annealing is executed, after the final annealing when the final annealing is executed, and one or both of timing after the intermediate annealing and timing after the final annealing when both the intermediate annealing and the final annealing are executed.

Effects of Invention

The present invention provides an aluminum alloy brazing sheet having excellent brazability in brazing in an inert gas atmosphere without using a flux, and a method for manufacturing the same.

BRIEF EXPLANATION OF DRAWINGS

FIG. 1 is a diagram illustrating assembly of a clearance filling test piece in examples and comparative examples.

EMBODIMENTS OF INVENTION

Mg, Li, and Ca break a film-like oxide formed on a surface of a brazing material during brazing heating, and effectively expose a new surface of the molten brazing material. In addition, because Mg, Li, and Ca have oxide generation energy smaller than that of Al, Mg, Li, and Ca reduce the film-like oxide mainly comprising Al during brazing heating, and form a particulate oxide including Mg, Li, and Ca. In particular, because the brazing material of the brazing sheet comprises any one or two or more of Mg, Li, and Ca more than 0.03 mass %, Mg, Li, and Ca are sufficiently diffused into the surface layer of the counterpart material (for example, a 3003 material) to which the brazing sheet is joined, and oxide particles comprising any one or two or more of Mg, Li, and Ca are formed in the 3003 material serving as the counterpart material. This causes change in the volume of the oxide on the surface of the counterpart material, and good brazability is acquired even in a joint having a large clearance.

An aluminum alloy brazing sheet according to the present invention is an aluminum alloy brazing sheet used for brazing in an inert gas atmosphere without using a flux, the aluminum alloy brazing sheet comprising:

a brazing material cladded onto at least one side surface of a core material, the core material being formed of aluminum or an aluminum alloy core material comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities, the brazing material being an aluminum alloy brazing material comprising any one or two or more of Si of 4.00 to 13.00 mass %, Mg more than 0.03 mass % and 3.00 mass % or less, Li more than 0.03 mass % and 3.00 mass % or less, and Ca more than 0.03 mass % and 3.00 mass % or less, with the balance being aluminum and inevitable impurities, in which an oxide is formed on a surface of the aluminum alloy brazing sheet by brazing heating, the oxide including any one or two or more of Mg, Li, and Ca and having a volume change ratio of 0.990 or less to a surface oxide film formed before brazing heating, and an atomic molar ratio of Mg, Li, and Ca to Al in the oxide formed on the surface of the aluminum alloy brazing sheet before brazing heating is 0.5 or less.

The aluminum alloy brazing sheet according to the present invention is an aluminum alloy brazing sheet used for brazing in an inert gas atmosphere without using a flux. The aluminum alloy brazing sheet according to the present invention is a clad material in which a brazing material having chemical composition illustrated as follows is cladded onto at least one side surface of a core material having chemical composition illustrated as follows. The aluminum alloy brazing sheet according to the present invention is: (1) a two-layer material in which a brazing material is cladded onto one side surface of a core material; (2) a three-layer material in which a brazing material is cladded onto each of side surfaces of a core material; or (3) a three-layer material in which a brazing material is cladded onto one side surface of a core material and a cladding material is cladded onto the other side surface of the core material.

The core material of the aluminum alloy brazing sheet according to the present invention is formed of aluminum or an aluminum alloy core material comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities.

When the core material is formed of aluminum, purity of the aluminum is not particularly limited, but preferably is 99.0 mass % or more, and particularly preferably 99.5 mass % or more.

In the aluminum alloy forming the core material, Fe contributes to improvement in strength. When the core material comprises Fe, the Fe content in the core material is 1.50 mass % or less, preferably 0.10 to 0.70 mass %, and particularly preferably 0.20 to 0.60 mass %. With the Fe content in the core material falling within the range described above, the strength of the core material increases. On the other hand, when the Fe content in the core material exceeds the range described above, corrosion resistance thereof decreases, and giant compounds are easily generated.

In the aluminum alloy forming the core material, Si contributes to improvement in strength. When the core material comprises Si, the Si content in the core material is 1.50 mass % or less, preferably 0.10 to 1.00 mass %, and particularly preferably 0.30 to 0.75 mass %. With the Si content in the core material falling within the range described above, the strength of the core material increases. On the other hand, when the Si content in the core material exceeds the range described above, the melting point thereof becomes too low, local melting occurs in brazing, and the core material is deformed to cause decrease in corrosion resistance.

In the aluminum alloy forming the core material, Cu contributes to improvement in strength and potential adjustment. When the core material comprises Cu, the Cu content in the core material is 2.00 mass % or less, preferably 0.10 to 1.00 mass %, and particularly preferably 0.15 to 0.80 mass %. With the Cu content in the core material falling within the range described above, the strength of the core material increases. On the other hand, when the Cu content in the core material exceeds the range described above, boundary corrosion easily occurs, and the melting point thereof becomes too low.

In the aluminum alloy forming the core material, Mn contributes to improvement in strength and potential adjustment. When the core material comprises Mn, the Mn content in the core material is 2.00 mass % or less, preferably 0.30 to 1.80 mass %, and particularly preferably 0.30 to 1.50 mass %. With the Mn content in the core material falling within the range described above, the strength of the core material increases, and the potential adjustment effect is acquired. On the other hand, when the Mn content in the core material exceeds the range described above, cracks easily occur in rolling of the material.

In the aluminum alloy forming the core material, Zn contributes to potential adjustment. When the core material comprises Zn, the Zn content in the core material is 3.00 mass % or less, preferably 0.50 to 3.00 mass %, and particularly preferably 1.50 to 3.00 mass %. With the Zn content in the core material falling within the range described above, the potential adjustment effect is acquired. On the other hand, when the Zn content in the core material exceeds the range described above, the natural electrode potential thereof becomes too low, and the corrosion resistance thereof decreases.

In the aluminum alloy forming the core material, Cr improves strength by solid solution strengthening, and precipitates Al—Cr based minute compounds to act on grain coarsening after brazing. The Cr content in the core material is 0.30 mass % or less, and preferably 0.10 to 0.20 mass %. With the Cr content in the core material falling within the range described above, the strength of the core material is enhanced. On the other hand, when the Cr content in the core material exceeds the range described above, giant intermetallic compounds are easily formed in casting, and plastic workability is reduced.

In the aluminum alloy forming the core material, Ti improves strength by solid solution strengthening, and is distributed in stratum to form a high potential layer and a low potential layer in the core material. With this structure, the corrosion form changes from a pitting form to a stratified form, and the effect of improving corrosion resistance is exhibited. The Ti content in the core material is 0.30 mass % or less, preferably 0.10 to 0.20 mass %, and particularly preferably 0.12 to 0.18 mass %. With the Ti content in the core material falling within the range described above, the strength of the core material is enhanced, and corrosion resistance thereof is enhanced. On the other hand, when the Ti content in the core material exceeds the range described above, giant intermetallic compounds are easily formed in casting, and plastic workability is reduced.

In the aluminum alloy forming the core material, Zr improves strength by solid solution strengthening, and precipitates Al—Zr based minute compounds to act on grain coarsening after brazing. The Zr content in the core material is 0.30 mass % or less, and preferably 0.10 to 0.20 mass %. With the Zr content in the core material falling within the range described above, the strength of the core material is enhanced, and the grain coarsening effect after brazing is acquired. On the other hand, when the Zr content in the core material exceeds the range described above, giant intermetallic compounds are easily formed in casting, and plastic workability is reduced.

In the aluminum alloy forming the core material, In contributes to potential adjustment. When the core material comprises In, the In content in the core material is 0.10 mass % or less, and preferably 0.01 to 0.03 mass %. With the In content in the core material falling within the range described above, the potential adjustment effect is acquired. On the other hand, when the In content in the core material exceeds the range described above, the natural electrode potential thereof becomes too low, and the corrosion resistance thereof decreases.

In the aluminum alloy forming the core material, Sn contributes to potential adjustment. When the core material comprises Sn, the Sn content in the core material is 0.10 mass % or less, and preferably 0.01 to 0.10 mass %. With the Sn content in the core material falling within the range described above, the potential adjustment effect is acquired. On the other hand, when the Sn content in the core material exceeds the range described above, the natural electrode potential thereof becomes too low, and the corrosion resistance thereof decreases.

The core material may comprise Bi. In the aluminum alloy forming the core material, Bi acts to suppress decrease in the Bi concentration of the brazing material when the brazing material is molten, and melt some of the core material during brazing heating, and exhibits the effect of reducing the surface tension of the Al—Si molten brazing filler metal. When the core material comprises Bi, the Bi content in the core material is 1.00 mass % or less, and preferably 0.10 to 1.00 mass %. The Bi content in the core material falling within the range described above produces the effect of being molten into the brazing material and reducing the surface tension. On the other hand, when the Bi content in the core material exceeds the range described above, rolling of the material becomes difficult.

The core material may comprise any one or two or more of Mg, Li, and Ca. When the core material comprises Mg, the Mg content in the core material is 3.00 mass % or less, and preferably 0.10 to 1.80 mass %. When the core material comprises Li, the Li content in the core material is 3.00 mass % or less, and preferably 0.10 to 1.80 mass %. When the core material comprises Ca, the Ca content in the core material is 3.00 mass % or less, and preferably 0.10 to 1.80 mass %. With the Mg, Li, or Ca content in the core material falling within the range described above, Mg, Li, or Ca acts to suppress decrease in the Mg, Li, or Ca concentration of the brazing material when the brazing material is molten, and melt some of the core material during brazing heating. Accordingly, the volume change ratio of an oxide formed by oxidization of Mg, Li, or Ca on the surface of the brazing material becomes 0.990 or less, and the oxide film breaking effect of the brazing sheet or the counterpart material with Mg, Li, and Ca is enhanced, and excellent brazability is acquired. On the other hand, when the Mg, Li, or Ca content in the core material exceeds the range described above, the melting point of the core material decreases too much, and local melting occurs in the core material in brazing heating. This causes deformation of the core material, causes erosion of the core material with the molten brazing filler metal, and decreases the brazing joint property and/or corrosion resistance.

The core material may comprise Ag, B, Be, Cd, Co, Ga, Ge, Mo, Na, Ni, P, Pb, Sr, V, Hg, and Y of 0.05 mass % or less, as inevitable impurities.

The brazing material of the aluminum alloy brazing sheet according to the present invention is an aluminum alloy brazing material comprising:
(i) Si of 4.0 to 13.0 mass %; and
(ii) any one or two or more of Mg more than 0.03 mass % and 3.00 mass % or less, Li more than 0.03 mass % and 3.00 mass % or less, and Ca more than 0.03 mass % and 3.00 mass % or less, with the balance being aluminum and inevitable impurities.

The brazing material comprises Si as an indispensable element. The Si content in the brazing material is 4.00 to 13.00 mass %, and particularly preferably 4.50 to 12.00 mass %. With the Si content in the brazing material falling within the range described above, a sufficient liquid phase necessary for brazing joint is acquired. On the other hand, when the Si content in the brazing material is less than the range described above, the liquid phase quantity is insufficient. The Si content exceeding the range described above causes easy occurrence of cracks in manufacturing of the material, and causes difficulty in manufacturing of the brazing sheet.

The brazing material comprises any one or two or more of Mg, Li, and Ca.

When the brazing material comprises Mg, the Mg content in the brazing material exceeds 0.03 mass % and is 3.00 mass % or less, preferably 0.10 to 1.80 mass %, and particularly preferably 0.60 to 1.20 mass %. When the brazing material comprises Li, the Li content in the brazing material exceeds 0.03 mass % and is 3.00 mass % or less, preferably 0.04 to 1.80 mass %, and particularly preferably 0.10 to 1.80 mass %. When the brazing material comprises Ca, the Ca content in the brazing material exceeds 0.03 mass % and is 3.00 mass % or less, preferably 0.05 to 1.80 mass %, and particularly preferably 0.10 to 1.80 mass %. With the Mg, Li, or Ca content in the brazing material falling within the range described above, the volume change ratio of an oxide formed by oxidization of Mg, Li, or Ca during brazing heating is set to 0.990 or less to enhance the effect of breaking the oxide film on the brazing sheet or the counterpart material with Mg, Li, and Ca, and excellent brazability is achieved. On the other hand, the Mg, Li, and Ca contents in the brazing material less than the range described above reduce the effect of breaking the oxide film on the brazing sheet or the counterpart material with Mg, Li, and Ca. When the Mg, Li, and Ca contents exceed the range described above, oxidization of Mg, Li, and Ca proceeds during brazing heating, and an oxide having a volume change ratio more than 0.990 is formed.

The brazing material may comprise Bi. In the aluminum alloy forming the brazing material, Bi exhibits the effect of reducing the surface tension of the Al—Si molten brazing filler metal. When the brazing material comprises Bi, the Bi content in the brazing material is 1.00 mass % or less, preferably 0.50 mass % or less, more preferably 0.05 to 0.40 mass %, and particularly preferably 0.10 to 0.30 mass %. The Bi content in the brazing material falling within the range described above enables the effect of reducing the surface tension to be achieved easily. On the other hand, when the Bi content in the brazing material exceeds the range described above, the surface of the brazing material after brazing is discolored into black, and the brazability is reduced.

The brazing material may comprise any one or two or more of Na, Sr, and Sb. In the aluminum alloy forming the brazing material, Na, Sr, and Sb micronize the Si particles in the brazing material, and exhibit the effect of enhancing flowability of the brazing filler metal. When the brazing material comprises Na, the Na content in the brazing material is 0.05 mass % or less, preferably 0.005 to 0.04 mass %, and particularly preferably 0.007 to 0.04 mass %. When the brazing material comprises Sr, the Sr content in the brazing material is 0.05 mass % or less, preferably 0.005 to 0.04 mass %, and particularly preferably 0.005 to 0.02 mass %. When the brazing material comprises Sb, the Sb content in the brazing material is 0.05 mass % or less, and preferably 0.005 to 0.04 mass %.

The brazing material may comprise any one or two of Zn and Cu. In the aluminum alloy forming the brazing material, Zn and Cu reduce the melting point of the brazing material, and enable brazing at a temperature lower than 600° C. serving as an ordinary brazing temperature. When the brazing material comprises Zn, the Zn content in the brazing material is preferably 8.00 mass % or less, more preferably 1.00 to 8.00 mass %, particularly preferably 2.00 to 8.00 mass %, and further preferably 3.00 to 5.00 mass %, from the viewpoint of easily achieving the effect of reducing the melting point of the brazing material. On the other hand, when the Zn content in the brazing material exceeds 8.00 mass %, cracks occur in the brazing material during cold rolling, and no sound sheet material is acquired. In addition, when the brazing material comprises Zn, the Zn content in the brazing material is preferably 3.00 mass % or less, from the viewpoint of easily acquiring the effect of preventing the core material from being corroded by setting the potential of the brazing material less-noble and corroding the brazing material with priority over the core material. When the brazing material comprises Cu, the Cu content in the brazing material is 4.00 mass % or less, preferably 0.50 to 4.00 mass %, and particularly preferably 1.00 to 2.50 mass %. The Cu content in the brazing material falling within the range described above enhances the effect of reducing the melting point of the brazing material. On the other hand, when the Cu content in the brazing material exceeds the range described above, cracks occur in the brazing material during cold rolling, and no sound sheet material is acquired.

The brazing material may comprise Fe. In the aluminum alloy forming the brazing material, Fe crystallizes Al—Fe based relatively coarse compounds to act on grain micronizing of the brazing material after brazing. When the brazing material comprises Fe, the Fe content in the brazing material is 1.00 mass % or less, preferably 0.10 to 0.50 mass %, and particularly preferably 0.20 to 0.50 mass %. With the Fe content in the brazing material falling within the range described above, the grain micronizing effect is easily acquired. On the other hand, when the Fe content in the brazing material exceeds the range described above, giant intermetallic compounds are easily formed in casting, and plastic workability is reduced.

The brazing material may comprise any one or two or more of Mn, Cr, Ti, and Zr. In the aluminum alloy forming the brazing material, Mn, Cr, Ti, and Zr precipitate Al—Mn based, Al—Cr based, Al—Ti based, and Al—Zr based relatively coarse compounds, respectively, to act on grain coarsening after brazing. When the brazing material comprises Mn, the Mn content in the brazing material is 1.00 mass % or less, and preferably 0.10 to 0.60 mass %. With the Mn content in the brazing material falling within the range described above, the grain coarsening effect is easily acquired. On the other hand, when the Mn content in the brazing material exceeds the range described above, giant intermetallic compounds are easily formed in casting, and plastic workability is reduced. When the brazing material comprises Cr, the Cr content in the brazing material is 0.30 mass % or less, and preferably 0.01 to 0.03 mass %. With the Cr content in the brazing material falling within the range described above, the grain coarsening effect is easily acquired. On the other hand, when the Cr content in the brazing material exceeds the range described above, giant intermetallic compounds are easily formed in casting, and plastic workability is reduced. When the brazing material comprises Ti, the Ti content in the brazing material is 0.30 mass % or less, preferably 0.10 mass % or less, and particularly preferably 0.01 to 0.03 mass %. With the Ti content in the brazing material falling within the range described above, the grain coarsening effect is easily acquired. On the other hand, when the Ti content in the brazing material exceeds the range described above, giant intermetallic compounds are easily formed in casting, and plastic workability is reduced. When the brazing material comprises Zr, the Zr content in the brazing material is 0.30 mass % or less, and preferably 0.01 to 0.03 mass %. With the Zr content in the brazing material falling within the range described above, the grain coarsening effect is easily acquired. On the other hand, when the Zr content in the brazing material exceeds the range described above, giant intermetallic compounds are easily formed in casting, and plastic workability is reduced. The grain size after brazing is adjusted using the actions described above. The effect of the present invention can be sufficiently acquired within the range described above.

The brazing material may comprise In. In the aluminum alloy forming the brazing material, In exhibits the effect of preventing the core material from being corroded by setting the potential of the brazing material less-noble and corroding the brazing material with priority over the core material. When the brazing material comprises In, the In content in the brazing material is 0.10 mass % or less, preferably 0.01 to 0.03 mass %, and particularly preferably 0.02 to 0.03 mass %. With the In content in the brazing material falling within the range described above, the potential adjustment effect is easily acquired. On the other hand, when the In content in the brazing material exceeds the range described above, the natural electrode potential becomes too low, and the corrosion resistance is reduced.

The brazing material may comprise Sn. In the aluminum alloy forming the brazing material, Sn exhibits the effect of preventing the core material from being corroded by setting the potential of the brazing material less-noble and corroding the brazing material with priority over the core material. When the brazing material comprises Sn, the Sn content in the brazing material is 0.10 mass % or less, and preferably 0.01 to 0.05 mass %. With the Sn content in the brazing material falling within the range described above, the potential adjustment effect is easily acquired. On the other hand, when the Sn content in the brazing material exceeds the range described above, the natural electrode potential becomes too low, and the corrosion resistance is reduced.

The brazing material may comprise Ag, B, Be, Cd, Co, Ga, Ge, Mo, Ni, P, Pb, V, Hg, and Y of 0.05 mass % or less, as inevitable impurities.

The cladding material of the aluminum alloy brazing sheet according to the present invention is formed of aluminum or an aluminum alloy cladding material comprising Zn of 6.00 mass % or less, with the balance being aluminum and inevitable impurities. In the aluminum alloy brazing sheet according to the present invention, because the cladding material is cladded, the corrosion resistance of the aluminum product after brazing is further improved by the sacrificial anticorrosive effect. In the aluminum alloy brazing sheet according to the present invention, an oxide is formed on a surface on the brazing material side during brazing heating, and the oxide includes any one or two or more of Mg, Li, and Ca and has a volume change ratio of 0.990 or less, preferably 0.700 to 0.970, more preferably 0.700 to 0.950, and particularly preferably 0.800 to 0.900, to a surface oxide film formed before brazing heating. With this structure, a new surface of the brazing material is exposed in brazing heating in an inert gas atmosphere without using a flux, and the aluminum alloy brazing sheet has excellent brazability. For this reason, the aluminum alloy brazing sheet according to the present invention produces the effect of the present invention described above, regardless of whether the cladding material is cladded, or not cladded, onto a surface of the core material opposite to a surface provided with the brazing material.

When the cladding material is formed of aluminum, the purity of the aluminum is not particularly limited, but preferably 99.0 mass % or more, and particularly preferably 99.5 mass % or more.

When the cladding material is formed of an aluminum alloy comprising Zn, the Zn content in the cladding material is 6.00 mass % or less, and preferably 3.00 mass % or less. With the Zn content in the cladding material falling within the range described above, the sacrificial anticorrosive effect is enhanced. On the other hand, when the Zn content in the cladding material exceeds the range described above, the potential of the cladding material excessively decreases, and the progress of corrosion may be enhanced.

The cladding material may comprise Mn. In the aluminum alloy forming the cladding material, Mn contributes to improvement in strength. When the cladding material comprises Mn, the Mn content in the cladding material is 2.00 mass % or less, and preferably 0.30 to 1.80 mass %. With the Mn content in the cladding material falling within the range described above, the strength improvement effect is easily acquired. On the other hand, when the Mn content in the cladding material exceeds the range described above, cracks easily occur in rolling of the material.

The cladding material may comprise Mg. In the aluminum alloy forming the cladding material, Mg contributes to improvement in strength. When the cladding material comprises Mg, the Mg content in the cladding material is 3.00 mass % or less, preferably 0.30 to 1.80 mass %, and particularly preferably 0.40 to 1.80 mass %. With the Mg content in the cladding material falling within the range described above, the strength improvement effect is easily acquired. On the other hand, when the Mg content in the cladding material exceeds the range described above, cracks easily occur in rolling of the material.

The cladding material may comprise Si. In the aluminum alloy forming the cladding material, Si contributes to improvement in strength. When the cladding material comprises Si, the Si content in the cladding material is 5.00 mass % or less, preferably 0.10 to 1.50 mass %, more preferably 0.10 to 1.00 mass %, and particularly preferably 0.20 to 1.00 mass %. With the Si content in the cladding material falling within the range described above, the strength of the cladding material increases. In addition, the Si content in the cladding material is 1.50 to 5.00 mass %, and particularly preferably 2.50 to 4.50 mass %. When the Si content falls within the range of 1.50 to 5.00 mass %, the cladding material changes to a semi-molten state during brazing heating to supply a very small quantity of liquid-phase brazing filler metal and enhance brazability when the cladding material surface serves as the brazing surface. When the Si content in the cladding material exceeds the range described above, the melting point becomes too low, melting occurs in brazing, and the cladding material is deformed.

The cladding material may comprise Fe. In the aluminum alloy forming the cladding material, Fe contributes to improvement in strength. When the cladding material comprises Fe, the Fe content in the cladding material is 1.50 mass % or less, preferably 0.10 to 0.70 mass %, and particularly preferably 0.10 to 0.50 mass %. With the Fe content in the cladding material falling within the range described above, the strength improvement effect is easily acquired. On the other hand, when the Fe content in the cladding material exceeds the range described above, the corrosion resistance decreases, and giant compounds are easily generated.

The cladding material may comprise Cu. In the aluminum alloy forming the cladding material, Cu contributes to improvement in strength. When the cladding material comprises Cu, the Cu content in the cladding material is 1.00 mass % or less, and preferably 0.10 to 1.00 mass %. With the Cu content in the cladding material falling within the range described above, the strength improvement effect is easily acquired. On the other hand, when the Cu content in the cladding material exceeds the range described above, boundary corrosion easily occurs.

The cladding material may comprise any one or two or more of Ti, Zr, and Cr. In the aluminum alloy forming the cladding material, Ti, Zr, and Cr exhibit the effect of improving strength by solid solution strengthening. When the cladding material comprises Ti, the Ti content in the cladding material is 0.30 mass % or less, and preferably 0.10 to 0.20 mass %. When the cladding material comprises Zr, the Zr content in the cladding material is 0.30 mass % or less, and preferably 0.10 to 0.20 mass %. When the cladding material comprises Cr, the Cr content in the cladding material is 0.30 mass % or less, and preferably 0.10 to 0.20 mass %. With the Ti, Zr, or Cr content in the cladding material falling within the range described above, the strength improvement effect is easily acquired. On the other hand, when the Ti, Zr, or Cr content in the cladding material exceeds the range described above, giant intermetallic compounds are easily formed in casting, and plastic workability is reduced.

The cladding material may comprise In. In the aluminum alloy forming the cladding material, In exhibits the effect of preventing the core material from being corroded by setting the potential of the cladding material less-noble and corroding the cladding material with priority over the core material. When the cladding material comprises In, the In content in the cladding material is 0.10 mass % or less, and preferably 0.01 to 0.03 mass %. With the In content in the cladding material falling within the range described above, the potential adjustment effect is easily acquired. On the other hand, when the In content in the cladding material exceeds the range described above, the natural electrode potential becomes too low, and the corrosion resistance is reduced.

The cladding material may comprise Sn. In the aluminum alloy forming the cladding material, Sn exhibits the effect of preventing the core material from being corroded by setting the potential of the cladding material less-noble and corroding the cladding material with priority over the core material. When the cladding material comprises Sn, the Sn content in the cladding material is 0.10 mass % or less, and preferably 0.01 to 0.05 mass %. With the Sn content in the cladding material falling within the range described above, the potential adjustment effect is easily acquired. On the other hand, when the Sn content in the cladding material exceeds the range described above, the natural electrode potential becomes too low, and the corrosion resistance is reduced.

The cladding material may comprise Ag, B, Be, Bi, Ca, Cd, Co, Ga, Ge, Li, Mo, Na, Ni, P, Pb, Sr, V, and Hg of 0.05 mass % or less, as inevitable impurities.

The aluminum alloy brazing sheet according to the present invention is an aluminum alloy brazing sheet in which an oxide is formed on a surface thereof by brazing heating in an inert gas atmosphere without using a flux, and the oxide includes any one or two or more of Mg, Li, and Ca and has a volume change ratio of 0.990 or less, preferably 0.700 to 0.970, more preferably 0.700 to 0.950, and particularly preferably 0.800 to 0.900, to a surface oxide film formed before brazing heating. In brazing heating in an inert gas atmosphere without using a flux, when the oxide including Mg, Li, and Ca and having been subjected to brazing heating has a volume change ratio falling within the range described above to a surface oxide formed before brazing heating, and the formed particulate oxide includes Mg, Li, and Ca, because a new surface of the brazing material is effectively exposed in brazing heating, the aluminum alloy brazing sheet has excellent brazability.

By contrast, in brazing heating in an inert gas atmosphere without using a flux, when the oxide including one or two or more of Mg, Li, and Ca and having been subjected to brazing heating has a volume change ratio exceeding the range described above to a surface oxide formed before brazing heating, a new surface of the brazing material is not easily exposed in brazing heating. In the present invention, the volume change ratio of the oxide including one or two or more of Mg, Li, and Ca and formed by brazing heating is a volume change ratio to an oxide film formed on a surface of the brazing surface before brazing, and a value determined using the expression "volume per oxygen atom of oxide particles comprising one or two or more of Mg, Li, and Ca and formed by brazing heating/volume per oxygen atom of an oxide film formed on the surface of the brazing material before brazing". In the expression, the volume per oxygen atom is calculated by dividing the molecular weight of the oxide by density of the oxide.

Mg, Li, and Ca have oxide generation free energy smaller than that of Al, and are capable of not only reducing the oxide film but also forming an oxide having a volume change ratio of 0.990 or less. For this reason, Mg, Li, and Ca are content elements effective for exposing a new surface of the brazing material in brazing heating. For example, although a volume change ratio of MgO is 0.994, a volume change ratio of $MgAl_2O_4$ is 0.863 and smaller than 0.990. By contrast, Ba, Th, and Nd and the like are elements having oxide generation free energy smaller than that of Al, but are not effective content elements because they have no oxide having a volume change ratio of 0.990 or less. For example, volume change ratios of BaO and $BaAl_2O_4$ serving as oxides comprising Ba are 2.366 and 1.377, respectively, and Ba has no oxide having a volume change ratio of 0.990 or less.

An oxide film is formed on a surface of the brazing material of the aluminum alloy brazing sheet according to the present invention. In addition, a molar ratio of each of Mg, Li, and Ca to Al in the oxide film formed on the surface of the brazing material of the aluminum alloy brazing sheet according to the present invention is 0.50 or less in terms of atom. With the molar ratio (such as Mg/Al) of each of Mg, Li, and Ca to Al in the oxide film formed on the surface of the brazing material falling within the range described above in terms of atom, the volume change ratio of the oxide including Mg, Li, and Ca and formed by brazing heating on the oxide film formed on the surface of the brazing material before brazing is set to 0.990 or less. When the oxide film formed on the surface of the brazing material of the aluminum alloy brazing sheet according to the present invention comprises two or more of elements of Mg, Li, and Ca, the fact that the molar ratio of each of Mg, Li, and Ca to Al is 0.50 or less in terms of atom means that the molar ratio of each of Mg, Li, and Ca to Al is 0.5 or less in terms of atom for any of Mg, Li, and Ca.

The thickness of the oxide film formed on the surface of the brazing material of the aluminum alloy brazing sheet according to the present invention is preferably 50 nm or less, and more preferably 10 nm or less, in terms of easiness of breakage of the oxide film. When the thickness of the oxide film formed on the surface of the brazing material exceeds 50 nm, breakage of the oxide film becomes difficult to progress.

The aluminum alloy brazing sheet according to the present invention is suitably manufactured by a method for manufacturing the aluminum alloy brazing sheet according to the present invention described hereinafter.

A method for manufacturing an aluminum alloy brazing sheet according to the present invention is a method for manufacturing aluminum alloy brazing sheet, comprising executing at least hot working and cold working for (1) a stacked structure acquired by stacking a brazing material ingot and a core material ingot in this order; (2) a stacked structure acquired by stacking a brazing material ingot, a core material ingot, and a brazing material ingot in this order; or (3) a stacked structure acquired by stacking a brazing material ingot, a core material ingot, and a cladding material ingot in this order, to acquire an aluminum alloy brazing sheet, in which the core material ingot is formed of aluminum or an aluminum alloy comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities, the brazing material ingot is formed of an aluminum alloy comprising Si of 4.00 to 13.00 mass %, and any one or two or more of Mg more than 0.03 mass % and 3.00 mass % or less, Li more than 0.03 mass % and 3.00 mass % or less, and Ca more than 0.03 mass % and 3.00 mass % or less, with the balance being aluminum and inevitable impurities, the cladding material ingot is formed of aluminum or an aluminum alloy comprising Zn of 6.00 mass % or less, with the balance being aluminum and inevitable impurities, and intermediate annealing, final annealing, or annealing is executed, the intermediate annealing being executed between rolling passes in the cold working to heat the stacked structure at 250 to 450° C. for one hour or more in an atmosphere controlled to have an oxygen concentration of 10,000 ppm or less and a dew point of 20° C. or less, the final annealing being executed after a last pass of the cold working to heat the stacked structure at 250 to 450° C. for one hour or more in an atmosphere controlled to have an oxygen concentration of 10,000 ppm or less and a dew point of 20° C. or less, and the annealing being executed both between rolling passes in the cold working and after the last pass of the cold working to heat the stacked structure at 250 to 450° C. for one hour or more in an atmosphere controlled to have an oxygen concentration of 10,000 ppm or less and a dew point of 20° C. or less.

A method for manufacturing an aluminum alloy brazing sheet according to the present invention is a method for manufacturing an aluminum alloy brazing sheet, comprising executing at least hot working and cold working for: (1) a stacked structure acquired by superimposing a brazing material ingot and a core material ingot; (2) a stacked structure acquired by superimposing a brazing material ingot on each of both side surfaces of the core material ingot; or a stacked structure acquired by superimposing a brazing material ingot on one side surface of a core material ingot and superimposing a cladding material ingot on the other side surface of the core material ingot, that is, (1) a stacked structure acquired by stacking a brazing material ingot and a core material ingot in this order; (2) a stacked structure acquired by stacking a brazing material ingot, a core material ingot, and a brazing material ingot in this order; or (3) a stacked structure acquired by stacking a brazing material ingot, a core material ingot, and a cladding material ingot in this order, to acquire an aluminum alloy brazing sheet.

In the method for manufacturing an aluminum alloy brazing sheet according to the present invention, the types and the contents of the addition compositions in the core material ingot, the brazing material ingot, and the cladding material ingots are the same as the compositions and the contents of those in the core material, the brazing material, and the cladding material of the aluminum alloy brazing sheet according to the present invention.

Specifically, the core material ingot is formed of aluminum or an aluminum alloy comprising any one or two or more of Fe of 1.50 mass % or less, preferably 0.10 to 0.70 mass %, and particularly preferably 0.20 to 0.60 mass %, Si of 1.50 mass % or less, preferably 0.10 to 1.00 mass %, and particularly preferably 0.30 to 0.75 mass %, Cu of 2.00 mass % or less, preferably 0.10 to 1.00 mass %, and particularly preferably 0.15 to 0.80 mass %, Mn of 2.00 mass % or less, preferably 0.30 to 1.80 mass %, and particularly preferably 0.30 to 1.50 mass %, Zn of 3.00 mass % or less, preferably 0.50 to 3.00 mass %, and particularly preferably 1.50 to 3.00 mass %, Cr of 0.30 mass % or less, and preferably 0.10 to 0.20 mass %, Ti of 0.30 mass % or less, preferably 0.10 to 0.20 mass %, and particularly preferably 0.12 to 0.18 mass %, Zr of 0.30 mass % or less, and preferably 0.10 to 0.20 mass %, In of 0.10 mass % or less, and preferably 0.01 to 0.03 mass %, and Sn of 0.10 mass % or less, and preferably 0.01 to 0.10 mass %, and comprising, if necessary, Bi of 1.00 mass % or less, and preferably 0.10 to 1.00 mass %, and, if necessary, any one or two or more of Mg of 3.00 mass % or less, and preferably 0.10 to 1.80 mass %, Li of 3.00 mass % or less, and preferably 0.10 to 1.80 mass %, and Ca of 3.00 mass % or less, and preferably 0.10 to 1.80 mass %, with the balance being aluminum and inevitable impurities. The core material ingot may comprise Ag, B, Be, Cd, Co, Ga, Ge, Mo, Na, Ni, P, Pb, Sr, V, Hg, and Y of 0.05 mass % or less, as inevitable impurities.

The brazing material ingot is formed of an aluminum alloy comprising Si of 4.00 to 13.00 mass %, and particularly preferably 4.50 to 12.00 mass %, and any one or two or more of Mg more than 0.03 mass % and 3.00 mass % or less, preferably 0.10 to 1.80 mass %, and particularly preferably 0.60 to 1.20 mass %, Li more than 0.03 mass % and 3.00 mass % or less, preferably 0.04 to 1.80 mass %, and particularly preferably 0.10 to 1.80 mass %, and Ca more than 0.03 mass % and 3.00 mass % or less, preferably 0.05 to 1.80 mass %, and particularly preferably 0.10 to 1.80 mass %, and comprising, if necessary, Bi of 1.00 mass % or less, preferably 0.50 mass % or less, more preferably 0.05 to 0.40 mass %, and particularly preferably 0.10 to 0.30 mass %, and, if necessary, any one or two or more of Na of 0.05 mass % or less, preferably 0.005 to 0.04 mass %, and particularly preferably 0.007 to 0.04 mass %, Sr of 0.05 mass % or less, preferably 0.005 to 0.04 mass %, and particularly preferably 0.005 to 0.02 mass %, Sb of 0.05 mass % or less, and preferably 0.005 to 0.04 mass %, Zn of 8.00 mass % or less, preferably 1.00 to 8.00 mass %, more preferably 2.00 to 8.00 mass %, and particularly preferably 3.00 to 5.00 mass %, Cu of 4.00 mass % or less, preferably 0.50 to 4.00 mass %, and particularly preferably 1.00 to 2.50 mass %, Fe of 1.00 mass % or less, preferably 0.10 to 0.50 mass %, and particularly preferably 0.20 to 0.50 mass %, Mn of 1.00 mass % or less, and preferably 0.10 to 0.60 mass %, Cr of 0.30 mass % or less, and preferably 0.01 to 0.03 mass %, Ti of 0.30 mass % or less, preferably 0.10 mass % or less, and particularly preferably 0.01 to 0.03 mass %, Zr of 0.30 mass % or less, and preferably 0.01 to 0.03 mass %, In of 0.10 mass % or less, preferably 0.01 to 0.03 mass %, and particularly preferably 0.02 to 0.03 mass %, and Sn of 0.10 mass % or less, and preferably 0.01 to 0.05 mass %, with the balance being aluminum and inevitable impurities. The brazing material ingot may comprise one or two or more of Ag, B, Be, Cd, Co, Ga, Ge, Mo, Ni, P, Pb, V, Hg, and Y of 0.05 mass % or less, as inevitable impurities.

The cladding material ingot is formed of aluminum or an aluminum alloy comprising Zn of 6.00 mass % or less, and preferably 3.00 mass % or less, and, if necessary, any one or two of more of Mn of 2.00 mass % or less, and preferably 0.30 to 1.80 mass %, Mg of 3.00 mass % or less, preferably 0.30 to 1.80 mass %, and particularly preferably 0.40 to 1.80 mass %, Si of 5.00 mass % or less, preferably 0.10 to 1.50 mass %, more preferably 0.10 to 1.00 mass %, and particularly preferably 0.20 to 1.00 mass % or Si of 5.00 mass % or less, and preferably 2.50 to 4.50 mass %, Fe of 1.50 mass % or less, preferably 0.10 to 0.70 mass %, and particularly preferably 0.10 to 0.50 mass %, Cu of 1.00 mass % or less, and preferably 0.10 to 1.00 mass %, Ti of 0.30 mass % or less, and preferably 0.10 to 0.20 mass %, Zr of 0.30 mass % or less, and preferably 0.10 to 0.20 mass %, Cr of 0.30 mass % or less, and preferably 0.10 to 0.20 mass %, In of 0.10 mass % or less, and preferably 0.01 to 0.03 mass %, and Sn of 0.10 mass % or less, and preferably 0.01 to 0.05 mass %, with the balance being aluminum and inevitable impurities. The cladding material ingot may comprise Ag, B, Be, Bi, Ca, Cd, Co, Ga, Ge, Li, Mo, Na, Ni, P, Pb, Sr, V, Hg, and Y of 0.05 mass % or less, as inevitable impurities.

In the method for manufacturing an aluminum alloy brazing sheet according to the present invention, hot rolling and cold rolling are executed for (1) a stacked structure acquired by stacking a brazing material ingot and a core material ingot in this order; (2) a stacked structure acquired by stacking a brazing material ingot, a core material ingot, and a brazing material ingot in this order; or (3) a stacked structure acquired by stacking a brazing material ingot, a core material ingot, and a cladding material ingot in this order. In hot rolling, a clad sheet is formed at 400 to 550° C., and thereafter processed to have a thickness of 2 to 3 mm while kept in a hot state. In cold rolling, a clad sheet is rolled with a plurality of passes in a cold manner and processed to have a predetermined thickness of an aluminum alloy brazing sheet.

In the method for manufacturing an aluminum alloy brazing sheet according to the present invention, intermediate annealing, final annealing, or annealing is executed. The intermediate annealing is executed between rolling passes in the cold working to heat the stacked structure at 250 to 450° C. for one hour or more in an atmosphere controlled to have an oxygen concentration of 10,000 ppm or less and a dew point of 20° C. or less, the final annealing is executed after the last pass of the cold working to heat the stacked structure at 250 to 450° C. for one hour or more in an atmosphere controlled to have an oxygen concentration of 10,000 ppm or less and a dew point of 20° C. or less, and the annealing is executed both between rolling passes in the cold working and after the last pass of the cold working to heat the stacked structure at 250 to 450° C. for one hour or more in an atmosphere controlled to have an oxygen concentration of 10,000 ppm or less and a dew point of 20° C. or less. The intermediate annealing or the final annealing has a large influence on the state of the oxide film, because it is a high-temperature step. The atmosphere of the intermediate annealing or the final annealing is an inert gas atmosphere, such as nitrogen gas, argon gas, and carbon dioxide gas. By executing intermediate annealing or final annealing in an atmosphere controlled to have an oxygen concentration of 10,000 ppm or less and a dew point of 20° C. or less, an aluminum alloy brazing sheet is easily acquired in which oxide particles comprising Mg, Li, and Ca and having a volume change ratio of 0.990 or less to an oxide film formed before brazing heating are formed on the surface thereof by brazing heating. When the oxygen concentration in the atmosphere in intermediate annealing or final annealing exceeds 10,000 ppm, growth of an oxide film is promoted, and/or the concentration of Mg, Li, and Ca in the oxide film easily increases. When the dew point of the atmosphere in intermediate annealing or final annealing exceeds 20° C., a hydroxide film is easily formed, and the oxide film is easily thickened.

In the method for manufacturing an aluminum alloy brazing sheet according to the present invention, if necessary, the brazing material surface of the brazing sheet may be etched using an acid aqueous solution and/or an alkaline aqueous solution, after intermediate annealing or final annealing is executed. Executing etching embrittles or removes the oxide film formed by heating in the intermediate annealing or the final annealing. As a result, brazability of the brazing sheet can be further improved. In the case of etching the surface of the brazing material, when the brazing material is cladded onto one side surface of the core material, only the brazing material surface may be etched, or both the brazing material surface and the opposite surface may be etched. When the brazing material is cladded onto both side surfaces of the core material, both the side surfaces are etched.

Examples of the acid solution used for etching of the brazing sheet include aqueous solutions, such as sulfuric acid, hydrochloric acid, nitric acid, phosphoric acid, and hydrofluoric acid. One of the acids may be used, or two or more of the acids may be used together. From the viewpoint of more efficiently removing the oxide film, it is preferable to use a mixed aqueous solution comprising hydrofluoric acid and acid other than hydrofluoric acid as the acid, and more preferable to use a mixed aqueous solution of hydrofluoric acid and sulfuric acid or a mixed aqueous solution of hydrofluoric acid and nitric acid. Examples of the alkaline solution used for etching of the brazing sheet include aqueous solutions, such as sodium hydroxide, potassium hydroxide, and calcium hydroxide. One of the alkaline solutions may be used, or two or more of the alkaline solutions may be used together. In the case of executing etching using an alkaline solution, desmutting is preferably carried out using a sulfuric acid aqueous solution and/or a nitric acid solution after the etching.

In the method for manufacturing an aluminum alloy brazing sheet according to the present invention, it is preferable to suppress growth of an oxide film and concentration of Mg, Li, and Ca into the oxide film during the manufacturing process.

The aluminum alloy brazing sheet according to the present invention is used for brazing in an inert gas atmosphere without using a flux. In addition, the aluminum alloy brazing sheet according to the present invention is subjected to brazing heating in an inert gas atmosphere without using a flux. In this manner, since oxide particles comprising Mg, Li, and Ca having a volume change ratio of 0.990 or less to the oxide film formed before brazing heating are formed on the surface of the aluminum alloy brazing sheet, a new surface of the brazing material is easily exposed, and excellent brazability is exhibited.

An aluminum alloy sheet (A) according to the present invention is an aluminum alloy sheet acquired by subjecting the aluminum alloy brazing sheet according to the present invention to brazing heating in an inert gas atmosphere without using a flux, in which oxide particles comprising Mg, Li, and Ca and having a volume change ratio of 0.990 or less to the oxide of the aluminum alloy brazing sheet having not been subjected to brazing heating are formed on the surface of the aluminum alloy sheet. Because the oxide of Mg, Li, and Ca formed on the surface of the aluminum alloy sheet (A) according to the present invention is particulate and has a volume change ratio of 0.990 or less to the oxide of the aluminum alloy brazing sheet having not been subjected to brazing heating, a new surface of aluminum alloy appears in part of the surface of the brazing sheet in brazing heating. Examples of the inert gas include nitrogen gas and argon gas. During the temperature rising, the oxygen concentration in the furnace when the temperature of the brazing sheet is 400° C. or more is 100 ppm or less, and the oxygen concentration when the temperature of the brazing sheet is 570° C. or more is 20 ppm or less, and preferably 10 ppm or less.

The aluminum alloy sheet (A) according to the present invention is an aluminum alloy sheet acquired after the aluminum alloy brazing sheet is brazed.

EXAMPLES

The following is an explanation of examples of the present invention in comparison with comparative examples to demonstrate an effect of the present invention. The examples illustrate embodiments of the present invention, and the present invention is not limited thereto.

Core material ingots and brazing material ingots having compositions listed in Table 1 and Table 2 were casted by continuous casting. Each of the acquired core material ingots was subjected to facing to a size of 163 mm×163 mm. Thereafter, each of the core material ingots to be cladded with a brazing material on only one side surface was subjected to facing to a size having a thickness of 27 mm, and each of the core material ingots to be cladded with a brazing material on both side surfaces was subjected to facing to a size having a thickness of 24 mm. Each of the acquired brazing material ingots was subjected to hot rolling to a thickness of 3 mm at 500° C., and cut into sizes of 163 mm×163 mm after being cooled.

TABLE 1

| Material number | Alloy composition (mass %) | | | | | | | | | | | | | |
|---|---|---|---|---|---|---|---|---|---|---|---|---|---|---|
| | Mg | Li | Ca | Fe | Si | Cu | Mn | Zn | Cr | Ti | Zr | In | Bi | Al |
| C1 | 0.60 | — | — | 0.60 | 0.30 | 0.15 | 1.20 | — | — | — | — | — | — | Balance |
| C2 | 0.60 | — | — | 0.20 | 0.50 | 0.50 | 1.20 | — | — | — | — | — | — | Balance |
| C3 | 0.50 | — | — | 0.20 | 0.50 | 0.50 | 1.20 | — | — | — | — | — | — | Balance |
| C4 | 0.60 | — | — | 0.20 | 0.30 | 0.15 | 1.20 | — | — | — | — | — | — | Balance |
| C5 | 1.00 | — | — | 0.20 | 0.30 | 0.15 | 1.20 | — | — | — | — | — | — | Balance |
| C6 | 0.60 | — | — | 0.20 | 0.30 | 0.15 | 1.20 | — | — | 0.15 | — | — | — | Balance |
| C7 | — | — | — | 0.20 | 0.30 | 0.15 | 1.20 | — | — | — | — | — | — | Balance |
| C8 | — | — | — | 0.20 | 0.50 | 0.50 | 1.20 | — | — | — | — | — | — | Balance |
| C9 | 1.00 | — | — | 0.60 | 0.30 | 0.15 | 1.20 | — | — | — | — | — | — | Balance |
| C10 | — | — | — | 0.60 | 0.25 | 0.15 | 1.15 | — | — | — | — | — | — | Balance |
| C11 | — | — | — | 0.20 | 0.30 | — | 1.20 | 1.50 | — | — | — | — | — | Balance |
| C12 | 0.60 | — | — | 0.50 | 0.20 | 0.15 | 1.20 | — | — | — | — | — | — | Balance |
| C13 | 0.35 | — | — | 0.20 | 0.75 | 0.80 | 1.50 | — | — | — | — | — | — | Balance |

TABLE 2

| Material number | Alloy composition (mass %) | | | | | | | | | | | | | | | |
|---|---|---|---|---|---|---|---|---|---|---|---|---|---|---|---|---|
| | Si | Mg | Li | Ca | Bi | Sr | Zn | Cu | Fe | Mn | Cr | Ti | Zr | In | Ba | Na | Al |
| F1 | 16.00 | 0.60 | — | — | — | — | — | — | 0.20 | — | — | — | — | — | — | — | Balance |
| F2 | 10.00 | — | — | 0.05 | — | — | — | — | 0.20 | — | — | — | — | — | — | — | Balance |
| F3 | 12.00 | 1.00 | — | — | 0.30 | — | — | — | 0.20 | — | — | — | — | — | — | 0.007 | Balance |
| F4 | 10.00 | 0.10 | — | — | 0.15 | 0.02 | — | — | 0.20 | — | — | — | — | — | — | — | Balance |
| F5 | 10.00 | 0.60 | — | — | 0.15 | 0.02 | 1.00 | — | 0.20 | — | — | 0.10 | — | — | — | — | Balance |
| F6 | 12.00 | 0.60 | — | — | 0.05 | — | — | — | 0.20 | — | — | — | — | — | — | — | Balance |
| F7 | 12.00 | 0.60 | — | — | 0.30 | — | — | — | 0.20 | — | — | — | — | — | — | — | Balance |
| F8 | 4.50 | 0.60 | — | — | 0.10 | — | 4.00 | — | 0.20 | — | — | — | — | — | — | — | Balance |
| F9 | 7.00 | 0.60 | — | — | 0.10 | — | 4.00 | — | 0.20 | — | — | — | — | — | — | — | Balance |
| F10 | 12.00 | 0.10 | — | — | 0.05 | — | — | — | 0.20 | — | — | — | — | — | — | — | Balance |
| F11 | 10.00 | 0.60 | — | — | 0.30 | — | — | — | 0.20 | — | — | 0.10 | — | — | — | — | Balance |
| F12 | 12.00 | 0.60 | — | — | 0.30 | — | 2.00 | — | 0.20 | — | — | — | — | — | — | — | Balance |
| F13 | 12.00 | 1.20 | — | — | 0.30 | — | — | — | 0.20 | — | — | — | — | — | — | — | Balance |
| F14 | 12.00 | 2.92 | — | — | 0.30 | — | — | — | 0.20 | — | — | — | — | — | — | — | Balance |

TABLE 2-continued

| Material number | Alloy composition (mass %) | | | | | | | | | | | | | | | |
|---|---|---|---|---|---|---|---|---|---|---|---|---|---|---|---|---|
| | Si | Mg | Li | Ca | Bi | Sr | Zn | Cu | Fe | Mn | Cr | Ti | Zr | In | Ba | Na | Al |
| F15 | 10.00 | 1.20 | — | — | 0.10 | — | — | — | 0.20 | — | — | — | — | 0.02 | — | — | Balance |
| F16 | 12.00 | 0.60 | — | — | 0.30 | — | — | — | 0.20 | — | — | — | — | — | — | — | Balance |
| F17 | 10.00 | 0.60 | — | — | — | — | — | — | 0.20 | — | — | — | — | — | — | — | Balance |
| F18 | 10.00 | 3.00 | — | — | — | — | — | — | 0.20 | — | — | — | — | — | — | — | Balance |
| F19 | 10.00 | — | — | — | — | — | — | — | 0.20 | — | — | — | — | — | — | — | Balance |
| F20 | 10.00 | 0.60 | — | — | 0.50 | — | — | — | 0.20 | — | — | — | — | — | — | — | Balance |
| F21 | 10.00 | 0.60 | — | — | 0.10 | — | — | — | 0.20 | — | — | — | — | 0.03 | — | — | Balance |
| F22 | 10.00 | — | 0.04 | — | 0.05 | — | — | — | 0.20 | — | — | — | — | — | — | — | Balance |
| F23 | 10.00 | 0.01 | — | — | 0.02 | — | — | — | 0.20 | — | — | — | — | — | — | — | Balance |
| F24 | 10.00 | 1.50 | — | — | 0.20 | — | — | — | 0.20 | — | — | — | — | — | — | — | Balance |
| F25 | 3.50 | 1.50 | — | — | 0.20 | — | — | — | 0.20 | — | — | — | — | — | — | — | Balance |
| F26 | 10.00 | 3.50 | — | — | 0.10 | — | — | — | 0.20 | — | — | — | — | — | — | — | Balance |

The prepared brazing material ingots and the core material ingots were superimposed in the combinations listed in Table 3. Thereafter, the combinations were subjected to hot rolling and cold rolling and subjected to final annealing under the conditions listed in Table 4 to acquire annealed clad materials. As other examples, the combinations were subjected to intermediate annealing under the conditions listed in Table 4 after hot rolling and cold rolling, and thereafter subjected to cold rolling to acquire annealed clad materials. As other examples, the combinations were subjected to intermediate annealing under the conditions listed in Table 4 after hot rolling and cold rolling, thereafter subjected to cold rolling, and thereafter subjected to final annealing under the conditions listed in Table 4 to acquire annealed clad materials. Cleaning was executed after annealing in the cases listed in Table 4. The final thickness was set to 0.3 to 1.0 mm. The acquired clad sheet materials were used as test pieces.

The thickness of the oxide film on the brazing material surface of each of the test pieces was measured by X-ray photoelectron spectroscopy (XPS). Oxygen was analyzed by XPS in the depth direction from the surface of the material, and the position of the measured peak half width of the oxygen was set as the oxide film thickness. In addition, a molar ratio (for example, Mg quantity/Al quantity) of each of Mg, Li, and Ca to aluminum (sum total of metal aluminum and aluminum compositions in the aluminum oxide) in the oxide film thickness in terms of atom was calculated.

As the oxide film thickness, a thickness of 10 nm or less is expressed as the most preferable thickness "A", a thickness more than 10 nm and 50 nm or less is expressed as "B", and a thickness more than 50 nm is expressed as "C" in the column "oxide film thickness" in Table 4. In the column "molar ratio", a ratio of 0.1 or less is expressed as "A", a ratio more than 0.1 and 0.5 or less is expressed as "B", and a ratio more than 0.5 is expressed as "C".

The brazability of each of the test pieces can be evaluated by executing a clearance filling test. Each of the test pieces used in the clearance filling test was mounted with SUS jigs in a state in which a 3003 bare material was disposed as a vertical plate and the test piece was disposed as a horizontal plate, and subjected to brazing in a nitrogen atmosphere in a furnace without using a flux, in the same manner as FIG. 1. As the brazing conditions, the oxygen concentration in the furnace when the test piece temperature during temperature rising was 400° C. or more was controlled to 50 ppm or less, and the oxygen concentration when the test piece temperature was 570° C. or more was controlled to 10 ppm or less, and the maximum temperature of the test piece was set to 600° C. Although the length of the vertical plate of an ordinary clearance filling test (LWS T8801) is 55 mm, the length of the vertical plate of each of the present test pieces was set to 25 mm to increase a gradient of a clearance formed between the horizontal plate and the vertical plate. In this manner, an evaluation method simulating a heat exchanger having a large clearance was adopted.

In the clearance filling test, the brazability can be evaluated on the basis of a length FL of fillet formed after brazing. In the column "brazability" in Table 3, the soundness of the FL and the fillet is expressed with three levels, that is, "A" indicates the case where the length FL was 5 mm or more and no partial fillet discontinuance occurred, "B" indicates the case where the length FL was 5 mm or more and partial fillet discontinuance occurred, and "C" indicates the case where the length FL was less than 5 mm. Among them, "A" was determined as a passing level.

The volume change ratio of oxide particles comprising Mg, Li, and Ca and formed after brazing to an oxide film formed before brazing heating was determined by determining the volume per oxygen atom by dividing the molecular weight of the oxide by a density disclosed in the publicly known document, and dividing the volume per oxygen atom by the volume per oxygen atom of the oxide film formed before brazing heating. The film composition of the oxide film formed before brazing heating is $Al_2O_3$, and the density thereof is determined as "3.0 g/cm$^3$". Table 3 lists analysis of the acquired clad sheet materials and performance test results of the brazability thereof.

TABLE 3

| | Brazing No. | Brazing material 1 | Core material | Brazing material 2 | Manufacturing condition | Atomic molar ratio to Al in oxide film | | Oxide film thickness (nm) | Volume change ratio (Type of oxide particles) | Brazability |
|---|---|---|---|---|---|---|---|---|---|---|
| | | | | | | Element | Molar ratio | | | |
| Examples | 1 | F2 | C1 | — | P5 | Ca | A | A | 0.967 ($CaAl_{12}O_{19}$) | A |
| | 2 | F3 | C2 | — | P1 | Mg | A | A | 0.863 ($MgAl_2O_4$) | A |

TABLE 3-continued

| | Brazing No. | Brazing material 1 | Core material | Brazing material 2 | Manufacturing condition | Element | Atomic molar ratio to Al in oxide film Molar ratio | Oxide film thickness (nm) | Volume change ratio (Type of oxide particles) | Brazability |
|---|---|---|---|---|---|---|---|---|---|---|
| | 3 | F4 | C3 | — | P4 | Mg | A | B | 0.863 (MgAl$_2$O$_4$) | A |
| | 4 | F5 | C3 | — | P4 | Mg | A | B | 0.863 (MgAl$_2$O$_4$) | A |
| | 5 | F6 | C3 | — | P4 | Mg | A | B | 0.863 (MgAl$_2$O$_4$) | A |
| | 6 | F7 | C3 | — | P6 | Mg | A | A | 0.863 (MgAl$_2$O$_4$) | A |
| | 7 | F8 | C4 | — | P1 | Mg | A | A | 0.863 (MgAl$_2$O$_4$) | A |
| | 8 | F9 | C4 | — | P1 | Mg | A | A | 0.863 (MgAl$_2$O$_4$) | A |
| | 9 | F11 | C4 | — | P1 | Mg | B | B | 0.863 (MgAl$_2$O$_4$) | A |
| | 10 | F12 | C6 | — | P1 | Mg | B | B | 0.863 (MgAl$_2$O$_4$) | A |
| | 11 | F13 | C7 | — | P1 | Mg | B | B | 0.863 (MgAl$_2$O$_4$) | A |
| | 12 | F14 | C7 | — | P1 | Mg | B | B | 0.863 (MgAl$_2$O$_4$) | A |
| | 13 | F17 | C1 | — | P2 | Mg | A | B | 0.863 (MgAl$_2$O$_4$) | A |
| | 14 | F18 | C1 | — | P3 | Mg | A | B | 0.863 (MgAl$_2$O$_4$) | A |
| | 15 | F20 | C1 | — | P1 | Mg | B | B | 0.863 (MgAl$_2$O$_4$) | A |
| | 16 | F21 | C9 | — | P1 | Mg | B | B | 0.863 (MgAl$_2$O$_4$) | A |
| | 17 | F22 | C8 | — | P1 | Li | A | A | 0.822 (LiAl$_5$O$_8$) | A |
| | 18 | F24 | C11 | F24 | P1 | Mg | A | B | 0.863 (MgAl$_2$O$_4$) | A |
| | 19 | F24 | C13 | — | P6 | Mg | A | A | 0.863 (MgAl$_2$O$_4$) | A |
| Comparative examples | 101 | F25 | C12 | — | P1 | Mg | A | A | 0.863 (MgAl$_2$O$_4$) | C |
| | 102 | F1 | C1 | | Edge crack occurred in hot rolling of brazing material and manufacturing was impossible | | | | | | |
| | 103 | F23 | C10 | — | P1 | Mg | A | B | 0.863 (MgAl$_2$O$_4$) | C |
| | 104 | F26 | C12 | — | P1 | Mg | C | C | 0.994 (MgO) | C |

TABLE 4

| | Annealing condition | | |
|---|---|---|---|
| Condition number | Oxygen concentration in atmosphere (ppm) | Dew point in atmosphere (° C.) | Acid cleaning |
| P1 | 10,000 or less | 20 or less | Not executed |
| P2 | 500 or less | 0 or less | Not executed |
| P3 | 100 or less | −10 or less | Not executed |
| P4 | 10,000 or less | 10 or less | After intermediate annealing |
| P5 | 10,000 or less | 10 or less | After final annealing |
| P6 | 10,000 or less | 10 or less | After intermediate annealing and after final annealing |

The invention claimed is:

1. An aluminum alloy brazing sheet used for brazing in an inert gas atmosphere without using a flux, the aluminum alloy brazing sheet comprising:
   a brazing material cladded onto at least one side surface of a core material,
   the core material being formed of aluminum or an aluminum alloy core material comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, and optionally any one or two or more of Mg of 3.00 mass % or less, Li of 3.00 mass % or less, Ca of 3.00 mass % or less, and Bi of 1.00 mass % or less, with the balance being aluminum and inevitable impurities,
   the brazing material being an aluminum alloy brazing material comprising Si of 4.00 to 13.00 mass %, and any one or two or more of Mg more than 0.10 mass % and 3.00 mass % or less, Li more than 0.04 mass % and 3.00 mass % or less, and Ca more than 0.03 mass % and 3.00 mass % or less, and optionally any one or two or more of Bi of 1.00 mass % or less, Na of 0.05 mass % or less, Sr of 0.05 mass % or less, Sb of 0.05 mass % or less, Zn of 8.00 mass % or less, Cu of 4.00 mass % or less, Fe of 1.00 mass % or less, Mn of 1.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities, wherein
   an oxide is formed on a surface of the aluminum alloy brazing sheet by brazing heating, the oxide including any one or two or more of Mg, Li, and Ca and having a volume change ratio of 0.990 or less to a surface oxide film formed before brazing heating, and
   an atomic molar ratio of Mg, Li, and Ca to Al in the oxide formed on the surface of the aluminum alloy brazing sheet before brazing heating is 0.5 or less.

2. The aluminum alloy brazing sheet according to claim 1, wherein the aluminum alloy brazing sheet is a two-layer material in which the brazing material is cladded onto one side surface of the core material.

3. The aluminum alloy brazing sheet according to claim 1, wherein the aluminum alloy brazing sheet is a three-layer material in which the brazing material is cladded onto each of both side surfaces of the core material.

4. The aluminum alloy brazing sheet according to claim 1, wherein
   the aluminum alloy brazing sheet is a three-layer material in which the brazing material is cladded onto one side surface of the core material and a cladding material is cladded onto the other side surface of the core material, and
   the cladding material is an aluminum alloy cladding material formed of aluminum or an aluminum alloy comprising Zn of 6.00 mass % or less, and optionally any one or two or more of Mn of 2.00 mass % or less, Mg of 3.00 mass % or less, Si of 5.00 mass % or less, Fe of 1.50 mass % or less, Cu of 1.00 mass % or less, Ti of 0.30 mass % or less, Zr of 0.30 mass % or less, Cr of 0.30 mass % or less, In of 0.10 mass % or less, and Sn of 0.10 mass % or less, with the balance being aluminum and inevitable impurities.

5. The aluminum alloy brazing sheet according to claim 1, wherein the oxide formed on a brazing material surface of the aluminum alloy brazing sheet has a thickness of 50 nm or less.

6. The aluminum alloy brazing sheet according to claim 2, wherein the oxide formed on a brazing material surface of the aluminum alloy brazing sheet has a thickness of 50 nm or less.

7. The aluminum alloy brazing sheet according to claim 3, wherein the oxide formed on a brazing material surface of the aluminum alloy brazing sheet has a thickness of 50 nm or less.

8. The aluminum alloy brazing sheet according to claim 4, wherein the oxide formed on a brazing material surface of the aluminum alloy brazing sheet has a thickness of 50 nm or less.

9. A method for manufacturing an aluminum alloy brazing sheet, the method comprising executing at least hot working and cold working for (1) a stacked structure acquired by stacking a brazing material ingot and a core material ingot in this order; (2) a stacked structure acquired by stacking a brazing material ingot, a core material ingot, and a brazing material ingot in this order; or (3) a stacked structure acquired by stacking a brazing material ingot, a core material ingot, and a cladding material ingot in this order, to acquire an aluminum alloy brazing sheet, wherein the core material ingot is formed of aluminum or an aluminum alloy comprising any one or two or more of Fe of 1.50 mass % or less, Si of 1.50 mass % or less, Cu of 2.00 mass % or less, Mn of 2.00 mass % or less, Zn of 3.00 mass % or less, Cr of 0.30 mass % or less, Ti of 0.30 mass % or less, Zr of 0.30 mass % or less, In of 0.10 mass % or less, and Sn of 0.10 mass % or less, and optionally any one or two or more of Mg of 3.00 mass % or less, Li of 3.00 mass % or less, and Ca of 3.00 mass % or less, with the balance being aluminum and inevitable impurities, the brazing material ingot is formed of an aluminum alloy comprising Si of 4.00 to 13.00 mass %, and any one or two or more of Mg more than 0.10 mass % and 3.00 mass % or less, Li more than 0.04 mass % and 3.00 mass % or less, and Ca more than 0.03 mass % and 3.00 mass % or less, and optionally any one or two or more of Na of 0.05 mass % or less, Sr of 0.05 mass % or less, Sb of 0.05 mass % or less, Zn of 8.00 mass % or less, Cu of 4.00 mass % or less, Fe of 1.00 mass % or less, Mn of 1.00 mass % or less, Cr of 0.30 mass % or less, Ti of 0.30 mass % or less, Zr of 0.30 mass % or less, In of 0.10 mass % or less, and Sn of 0.10 mass % or less, with the balance being aluminum and inevitable impurities, the cladding material ingot is formed of aluminum or an aluminum alloy comprising Zn of 6.00 mass % or less, and optionally any one or two or more of Mn of 2.00 mass % or less, Mg of 3.00 mass % or less, Si of 5.00 mass % or less, Fe of 1.50 mass % or less, Cu of 1.00 mass % or less, Ti of 0.30 mass % or less, Zr of 0.30 mass % or less, Cr of 0.30 mass % or less, In of 0.10 mass % or less, and Sn of 0.10 mass % or less, with the balance being aluminum and inevitable impurities, and intermediate annealing, final annealing, or annealing is executed, the intermediate annealing being executed between rolling passes in the cold working to heat the stacked structure at 250 to 450° C. for one hour or more in an atmosphere controlled to have an oxygen concentration of 10,000 ppm or less and a dew point of 20° C. or less, the final annealing being executed after a last pass of the cold working to heat the stacked structure at 250 to 450° C. for one hour or more in an atmosphere controlled to have an oxygen concentration of 10,000 ppm or less and a dew point of 20° C. or less, and the annealing being executed both between rolling passes in the cold working and after the last pass of the cold working to heat the stacked structure at 250 to 450° C. for one hour or more in an atmosphere controlled to have an oxygen concentration of 10,000 ppm or less and a dew point of 20° C. or less.

10. The method for manufacturing an aluminum alloy brazing sheet according to claim 9, wherein one of the core material ingot and the brazing material ingot further comprises Bi of 1.0 mass % or less.

11. The method for manufacturing an aluminum alloy brazing sheet according to claim 9, wherein a brazing material surface of a clad material is subjected to etching using one or both of an acid aqueous solution and an alkaline aqueous solution, the etching being executed after the intermediate annealing when the intermediate annealing is executed, after the final annealing when the final annealing is executed, and one or both of timing after the intermediate annealing and timing after the final annealing when both the intermediate annealing and the final annealing are executed.

12. The method for manufacturing an aluminum alloy brazing sheet according to claim 10, wherein a brazing material surface of a clad material is subjected to etching using one or both of an acid aqueous solution and an alkaline aqueous solution, the etching being executed after the intermediate annealing when the intermediate annealing is executed, after the final annealing when the final annealing is executed, and one or both of timing after the intermediate annealing and timing after the final annealing when both the intermediate annealing and the final annealing are executed.

\* \* \* \* \*